United States Patent
Keshavaraj

(10) Patent No.: US 7,461,861 B2
(45) Date of Patent: Dec. 9, 2008

(54) PROFILE TUNER PANEL FOR INFLATABLE CUSHIONS

(76) Inventor: Ramesh Keshavaraj, 305 Grovewood La., Peachtree City, GA (US) 30269

( * ) Notice: Subject to any disclaimer, the term of this patent is extended or adjusted under 35 U.S.C. 154(b) by 0 days.

(21) Appl. No.: 10/200,676

(22) Filed: Jul. 22, 2002

(65) Prior Publication Data
US 2004/0012182 A1  Jan. 22, 2004

(51) Int. Cl.
  *B60R 21/16* (2006.01)
(52) U.S. Cl. .................................. 280/743.1
(58) Field of Classification Search ............. 280/743.1, 280/743.2, 728.1, 731, 732
  See application file for complete search history.

(56) References Cited

U.S. PATENT DOCUMENTS

| | | | |
|---|---|---|---|
| 3,792,873 A | 2/1974 | Buchner et al. | 280/150 |
| 4,944,529 A | 7/1990 | Backhaus | 280/743 |
| 5,022,675 A * | 6/1991 | Zelenak et al. | 280/743.1 |
| 5,087,071 A * | 2/1992 | Wallner et al. | 280/743.1 |
| 5,090,729 A * | 2/1992 | Watanabe | 280/743.1 |
| 5,310,216 A | 5/1994 | Wehner et al. | 280/743 |
| 5,316,337 A | 5/1994 | Yamaji et al. | 280/743 |
| 5,348,343 A * | 9/1994 | Hawthorn | 280/730.1 |
| 5,423,273 A | 6/1995 | Hawthorn et al. | 112/441 |
| 5,454,594 A | 10/1995 | Krickl | 280/743.1 |
| 5,460,401 A * | 10/1995 | Gans et al. | 280/728.3 |
| 5,520,414 A * | 5/1996 | Bishop | 280/743.1 |
| 5,520,416 A | 5/1996 | Singer, III et al. | 280/775 |
| 5,529,340 A * | 6/1996 | Fairbanks | 280/743.1 |
| 5,533,755 A | 7/1996 | Nelsen et al. | 280/743.1 |
| 5,577,765 A * | 11/1996 | Takeda et al. | 280/729 |
| 5,584,508 A * | 12/1996 | Maruyama et al. | 280/743.1 |
| 5,865,467 A * | 2/1999 | Bito et al. | 280/743.1 |
| 5,913,535 A * | 6/1999 | Taguchi et al. | 280/729 |
| 5,931,498 A * | 8/1999 | Keshavaraj | 280/743.1 |
| 6,053,527 A * | 4/2000 | Gans et al. | 280/728.3 |
| 6,129,382 A * | 10/2000 | Tonooka | 280/743.1 |
| 6,183,003 B1 * | 2/2001 | Matsuhashi et al. | 280/728.2 |
| 6,382,662 B1 * | 5/2002 | Igawa | 280/729 |
| 6,382,664 B1 * | 5/2002 | Hirano et al. | 280/730.2 |
| 6,390,501 B1 * | 5/2002 | Greib et al. | 280/743.2 |
| 6,439,606 B2 * | 8/2002 | Okada et al. | 280/743.1 |
| 6,472,033 B1 * | 10/2002 | Keshavaraj | 428/35.2 |
| 6,672,618 B2 * | 1/2004 | Keshavaraj | 280/743.1 |
| 6,837,517 B2 * | 1/2005 | Keshavaraj | 280/743.1 |
| 2002/0093184 A1 * | 7/2002 | Hirano et al. | 280/743.1 |

* cited by examiner

*Primary Examiner*—Faye M. Fleming
(74) *Attorney, Agent, or Firm*—John E. Vick, Jr.; Cheryl J. Brickey

(57) ABSTRACT

A profile tuner panel that adjusts an air bag profile for top mounted or ¾ mounted cushions and causes the air bags to have enough rotation around an instrumental panel. The profile tuner panel is a section of fabric that is used to form at least part of the mouth section of the airbag cushion in the desired position with respect to the cushion, the module, and the frame of the car, and is also used to rotate and orient the cushion properly upon deployment.

9 Claims, 10 Drawing Sheets

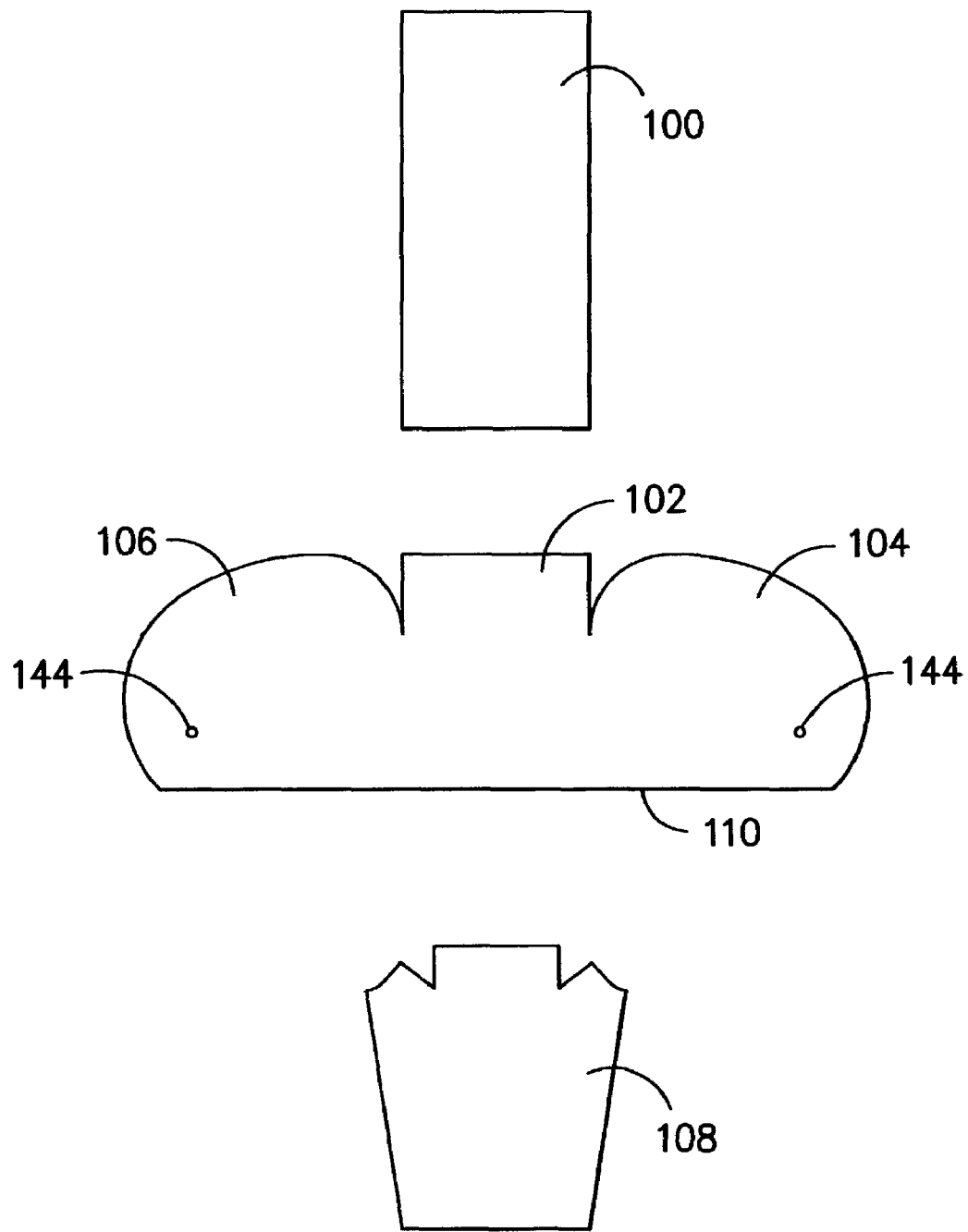
FIG. -1-

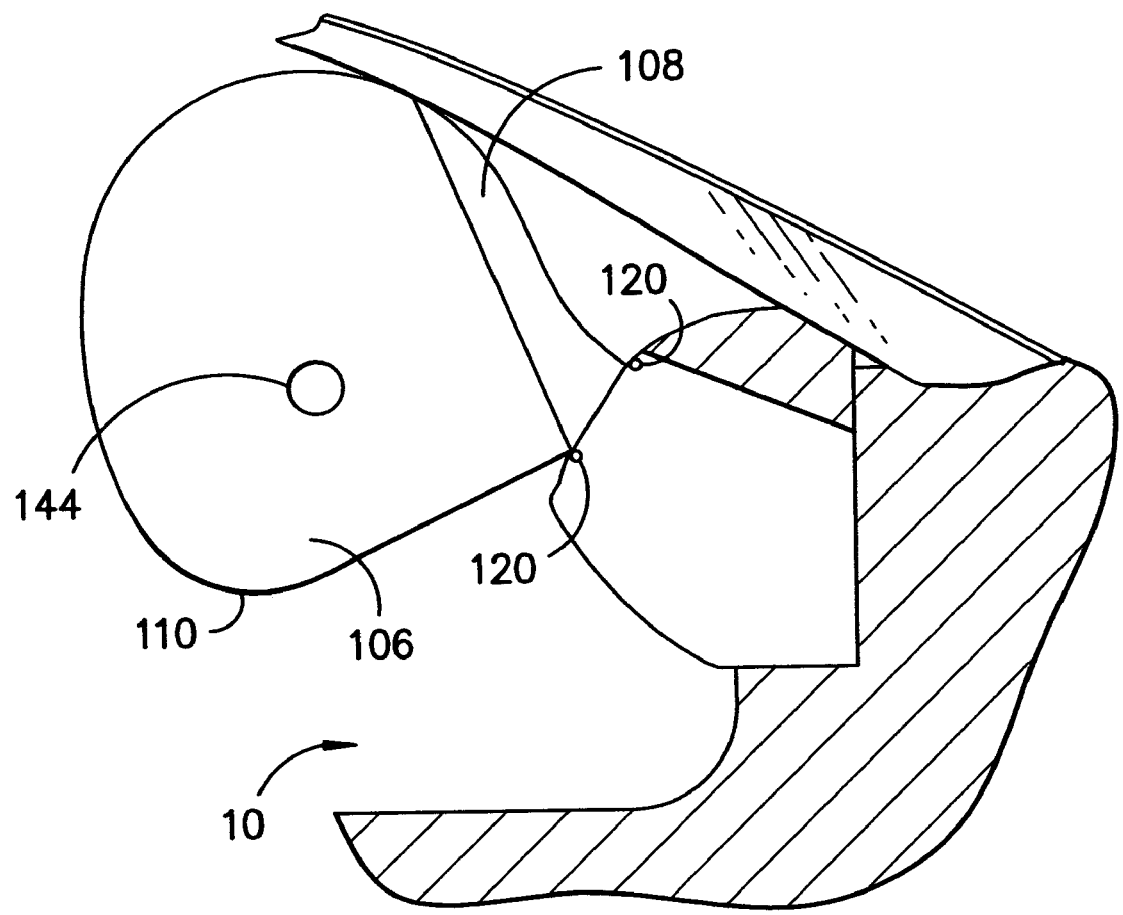
FIG. —1A—

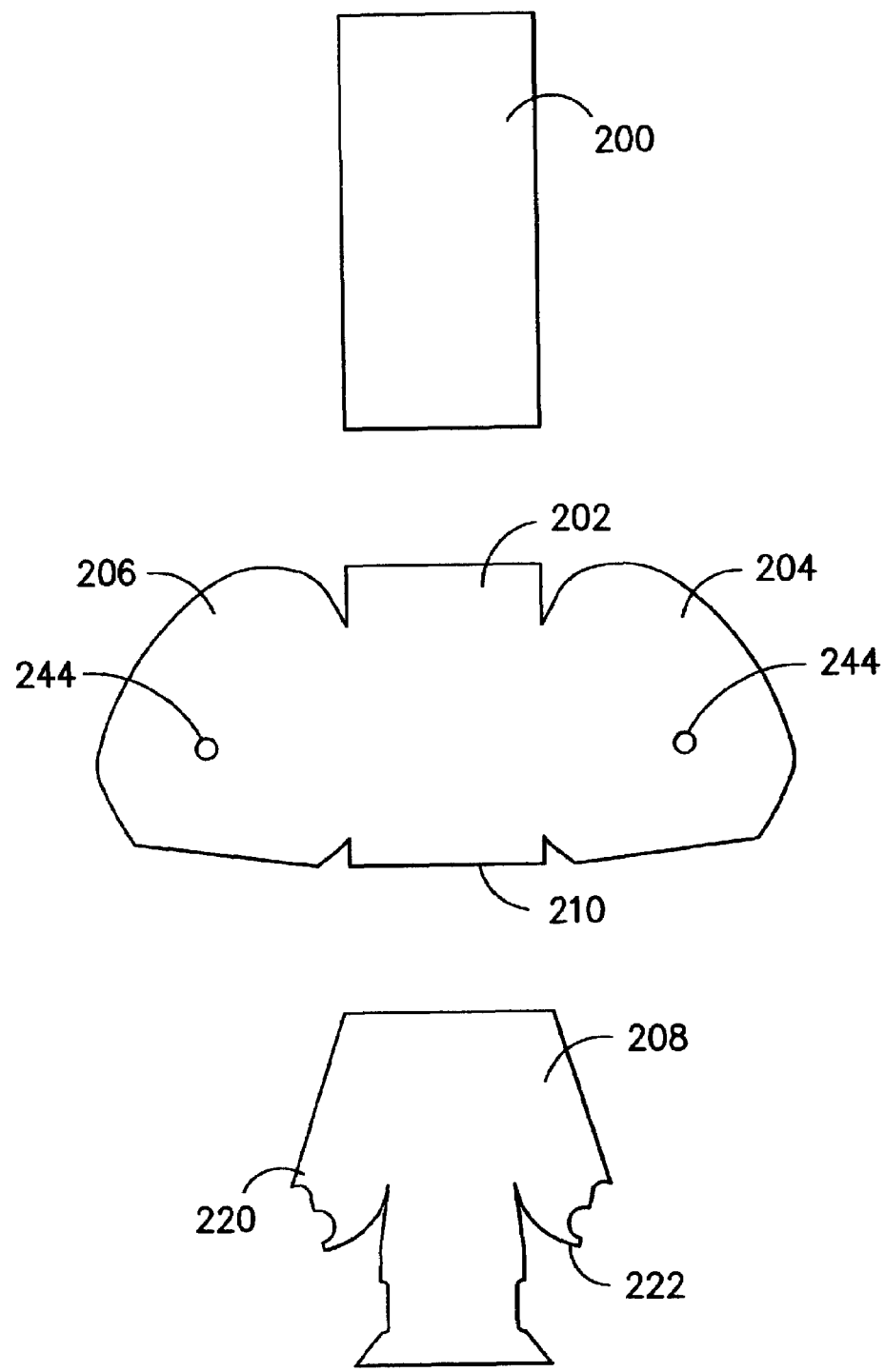
FIG. -2-

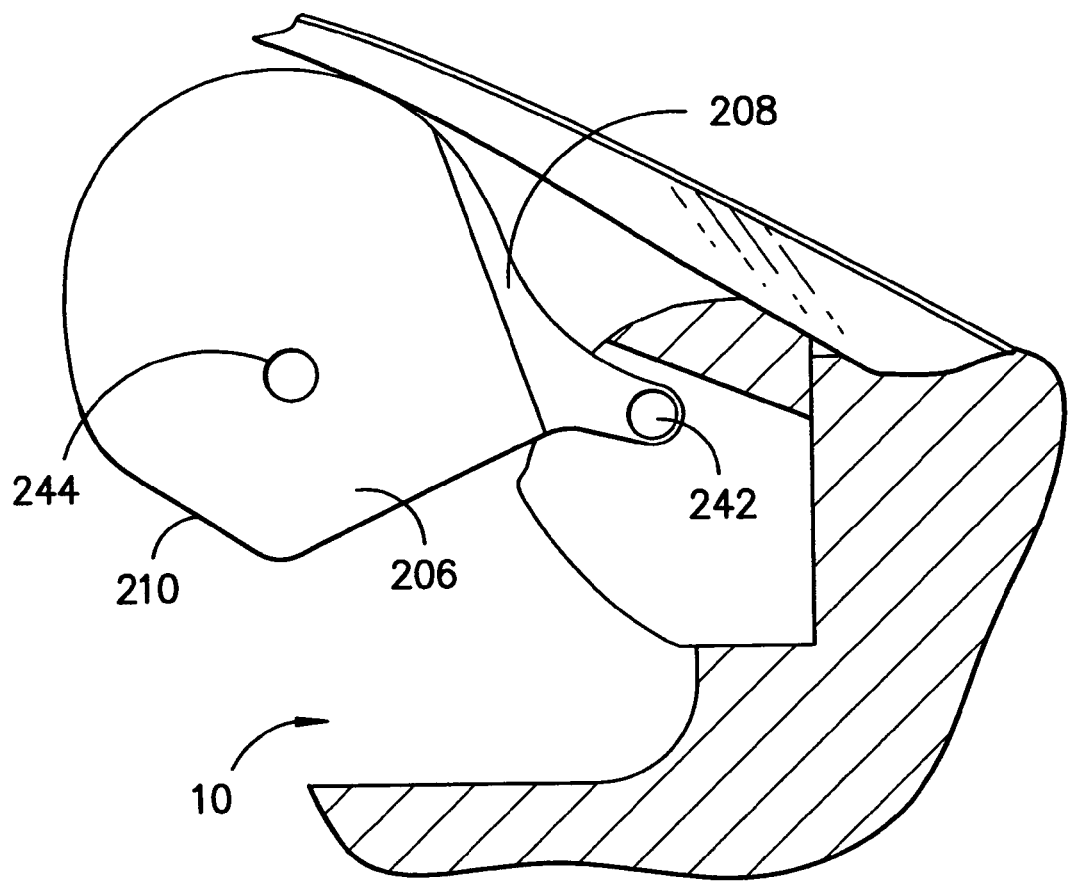
FIG. —2A—

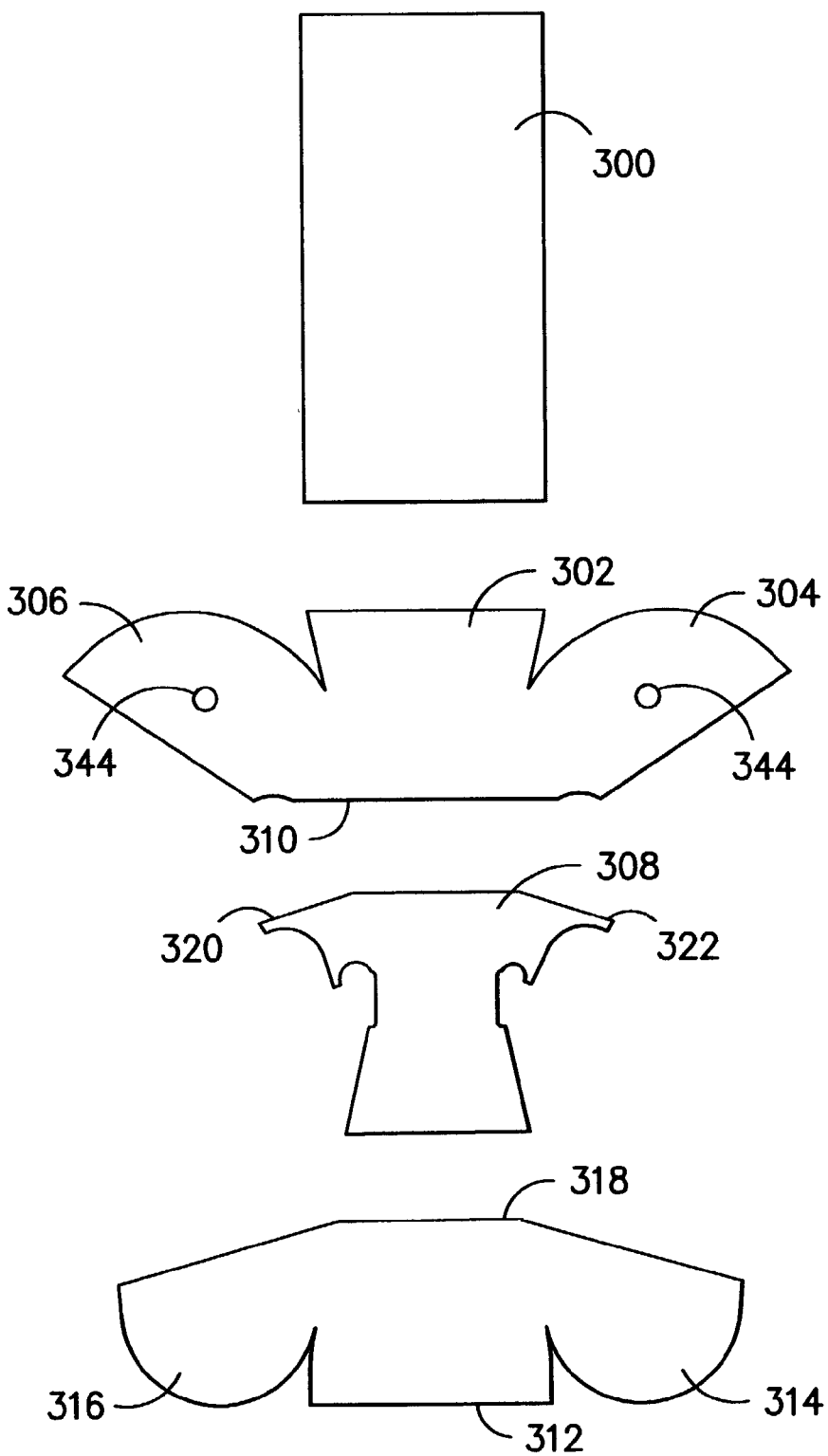
FIG. -3-

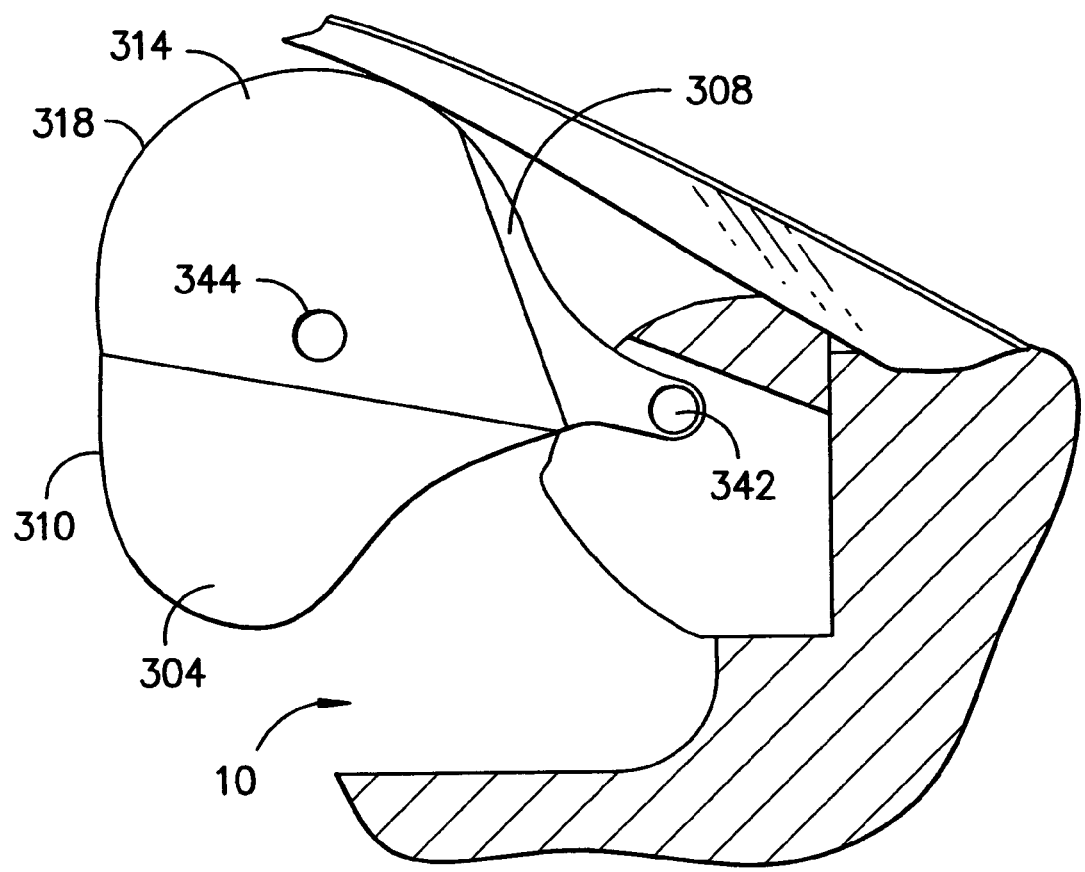
FIG. —3A—

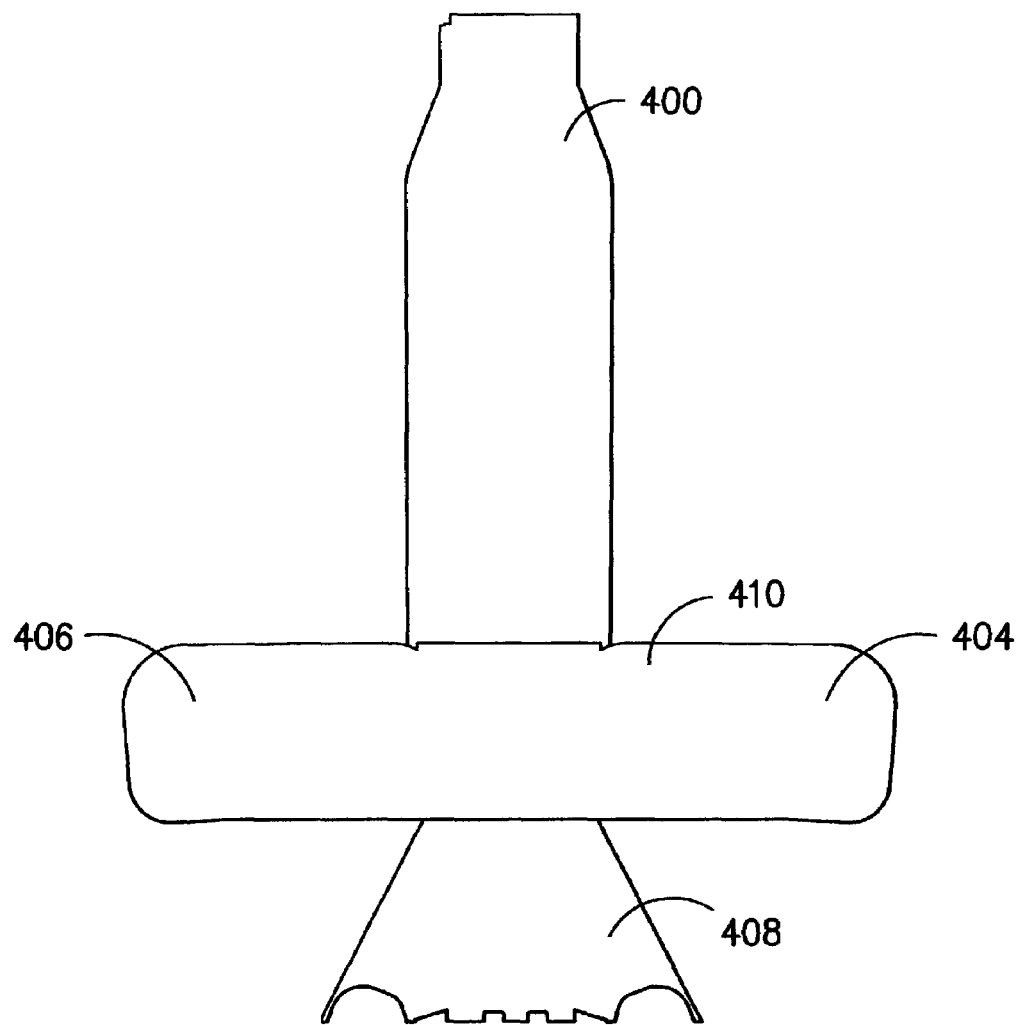
FIG. -4-

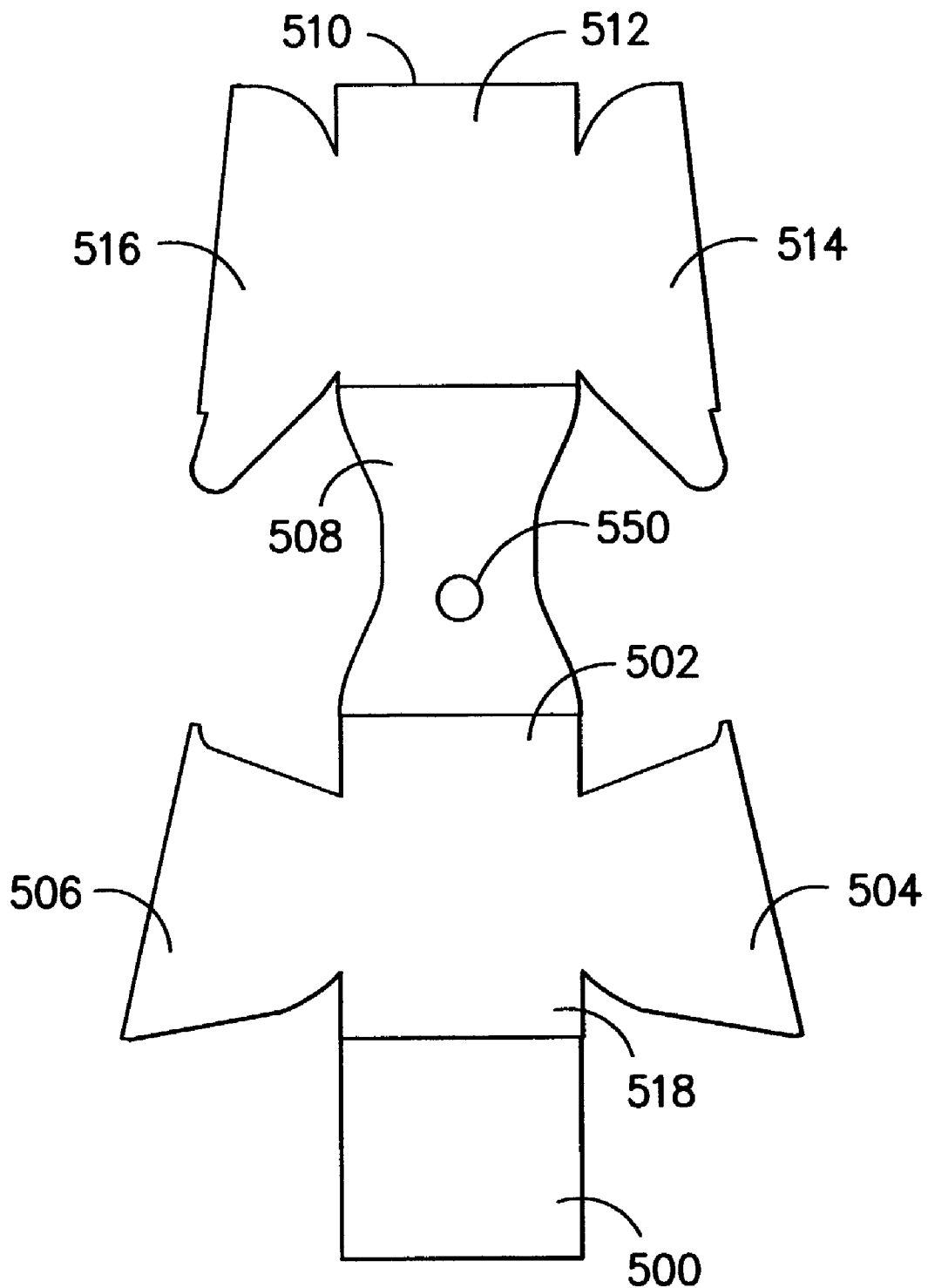
FIG. —5—

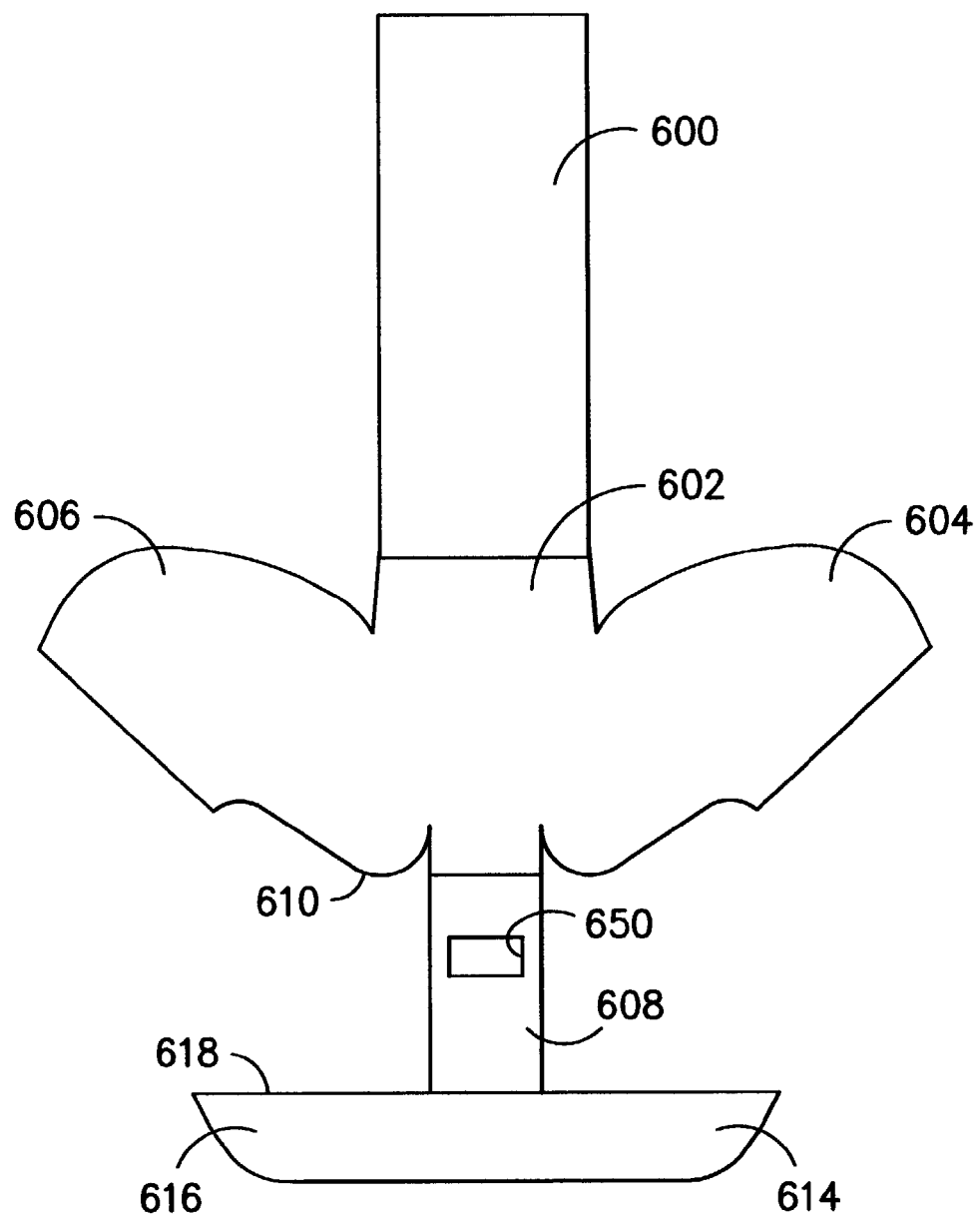
FIG. −6−

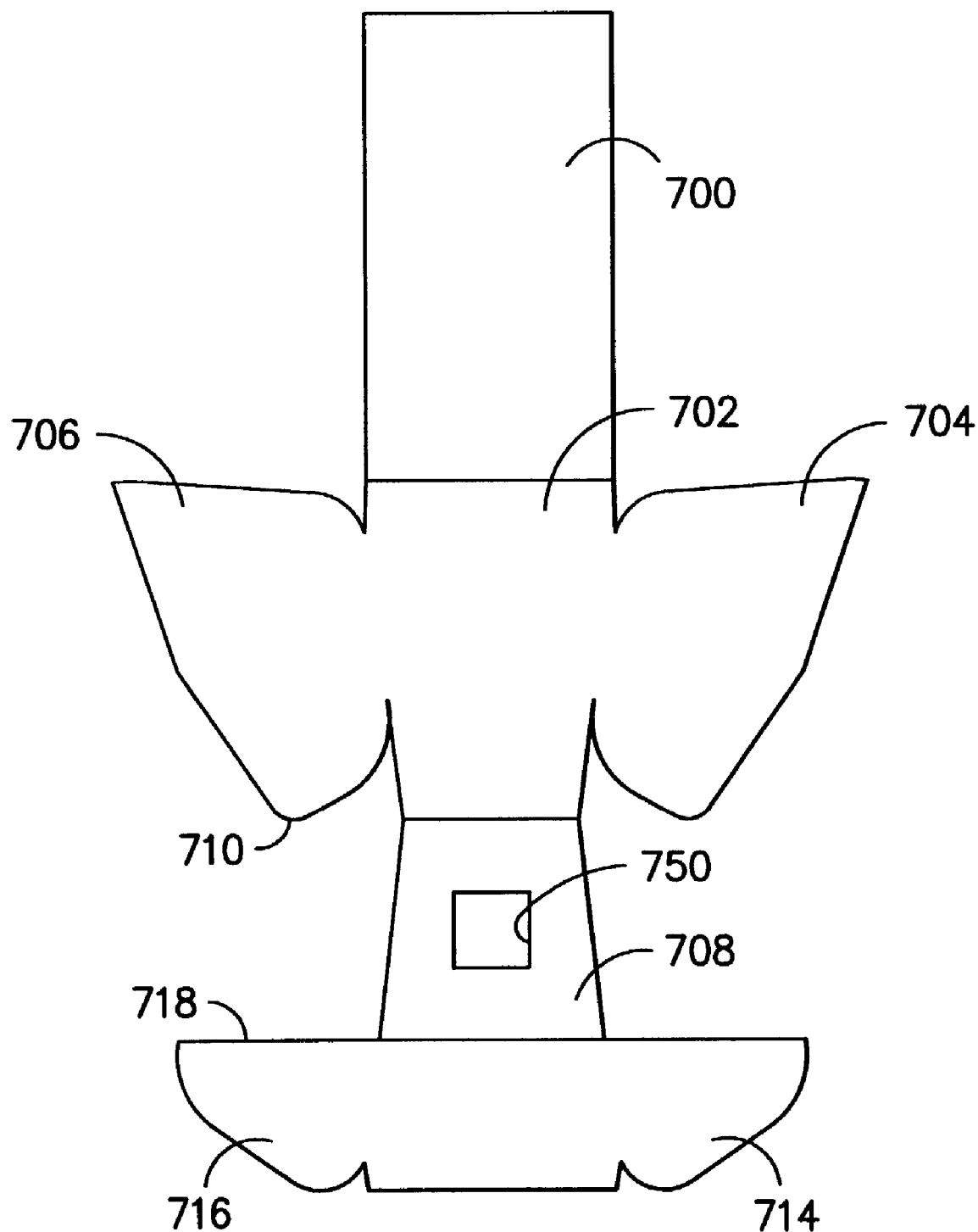
FIG. -7-

PROFILE TUNER PANEL FOR INFLATABLE CUSHIONS

BACKGROUND

An inflatable cushion disposed within a supporting structure such as a dash panel, side door or other fixed portion of a car body in opposing relation to a seat in the vehicle plays an important role in protecting the occupants of a vehicle from injury due to collision against the car body. Typically, the inflatable cushion is inflated rapidly by the pressure of a reaction gas released from an inflator during a collision. This gas generation typically takes place when a gas generating agent in the inflator induces a chemical reaction by a collision signal from a collision detecting sensor when the deceleration of the vehicle exceeds a certain level. The gas generated by the generator is then conveyed to the inflatable cushion which expands outwardly as it fills with gas to create a protective barrier between the vehicle occupant and the dash panel or other portion of the vehicle body/internal surface against which the occupant might otherwise be thrown.

To elaborate, inflatable protective cushions used in passenger vehicles are a component of relatively complex passive restraint systems. The main elements of these systems are: an impact sensing system, an ignition system, a propellant material, an attachment device, a system enclosure, and an inflatable protective cushion. Upon sensing an impact, the propellant is ignited causing an explosive release of gases filing the cushion to a deployed state that can absorb the impact of the forward movement of a body and dissipate its energy by means of rapid venting of the gas. In the undeployed state, the cushion is stored in or near the steering column, the dashboard, in a door, or in the back of a front seat placing the cushion in close proximity to the person or object it is to protect.

Inflatable cushion systems, commonly referred to as air bag systems, have been used in the past to protect both the operator of the vehicle and passengers. Systems for the protection of the vehicle operator have typically been mounted in the steering column of the vehicle and have utilized cushion constructions directly deployable towards the driver. These driver-side cushions are typically of a relatively simple configuration in that they function over a fairly small well-defined area between the driver and the steering column. One such configuration is disclosed in U.S. Pat. No. 5,533,755 to Nelsen et al., the teachings of which are incorporated herein by reference.

Inflatable cushions for use in the protection of passengers against frontal or side impacts must generally have a more complex configuration since the position of a vehicle passenger may not be well defined and greater distance may exist between the passenger and the surface of the vehicle against which that passenger might be thrown in the event of a collision. Prior cushions for use in such environments are disclosed in U.S. Pat. No. 5,520,416 to Bishop, issued May 28, 1996; U.S. Pat. No. 5,454,594 to Krickl issued Oct. 3, 1995; U.S. Pat. No. 5,423,273 to Hawthorn et al. issued Jun. 13, 1995; U.S. Pat. No. 5,316,337 to Yamaji et al. issued May 31, 1994; U.S. Pat. No. 5,310,216 to Wehner et al. issued on May 10, 1994; U.S. Pat. No. 5,090,729 to Watanabe issued Feb. 25, 1992; U.S. Pat. No. 5,087,071 to Wallner et al. issued Feb. 11, 1992; U.S. Pat. No. 4,944,529 to Backhaus issued Jul. 31, 1990; and U.S. Pat. No. 3,792,873 to Buchner et al. issued Feb. 19, 1974, all of which are incorporated herein by reference.

However, a problem still exists in the prior art to adequately protect occupants of vehicles when the distance between the passenger and the origin of the air bag is greater than the comparative distance of a vehicle's driver and the steering column. Often the gap that needs to be filled cannot be adequately done with a straight deployment, leaving gaps. Even worse, an instrumental pane, can hinder a linearly deployed air bag, or alternately a linearly deployed air bag cannot move sufficiently upon deployment to protect an occupant. Air bags that do fill gaps between occupants and the vehicle frame, by necessity, have to be large, resulting in elaborated deployment and costing significantly more to make in both materials and manpower than the simple driver's side design. At the same time, solutions to these problems tend to sacrifice other important elements of inflatable cushion design such as simplified sewing patterns, product robustness and manufacturing cost.

Further, passenger airbags designed for top mount or ¾ mount applications require the airbag cushion to rotate in order to cover the instrument panel. In these applications, the depth of the module has a significant effect on the cushion design. In modules where the height differential from the top of the module to the attachment point of the cushion is minimal, slits may be provided in the bottom portion of the airbag cushion to cause rotation thereof. However, in the situation where the height differential is larger, the profile becomes difficult to adjust in order to cause bag rotation.

What is needed is an improved top-mounted or ¾ mounted inflatable cushion that will adequately protect vehicle occupants while at the same time keep relatively simple sewing patterns, good product robustness and minimize costs. It would also be desirable to provide an apparatus and method that allows a variety of airbag cushions to fit within a variety of airbag modules, so that such cushions may be adapted to be top mounted with respect to the instrumental panel or dashboard of an automobile. It would also be desirable to provide a device that may adjust the profile of a cushion in situations where the height differential between the top of the module and the attachment point of the cushion is significant.

SUMMARY OF THE INVENTION

The present invention improves the design of top-mounted inflatable cushions (air bags) by the use of an additional piece of fabric, referred to as a profile tuner panel, that adjusts the air bag profile and causes the air bags to have enough rotation around the instrument panel. The present invention accomplishes this task while maintaining simplified sewing patterns, air bag robustness and reduced cost.

In one embodiment of the present invention, a top mounted inflatable cushion has a profile tuner panel connecting the main body of the air bag to the frame of the vehicle. The shape of the profile tuner panel causes the air bag to rotate in a specific manner upon deployment, thereby avoiding internal features of the vehicle and/or more efficiently filling space between a passenger the vehicle frame.

In another embodiment of the present invention, a profile tuner panel is described, having roughly trapezoidal shape and at least two side extensions. In a further refinement of this invention, the profile tuner panel has an extended tail section for varied attachment to the vehicle frame. In an alternate refinement of this embodiment, the profile tuner panel is cut as part of at least one body panel. The profile tuner panel may be adapted to form an open mouth utilizing rigid rods (rod pocket construction), or may be adapted to form a pair of generally circular holes into which an inflator may be inserted (closed pocket construction). Essentially, the profile tuner panel is a section of fabric that is used to form and position the mouth section of the cushion in the proper place with respect to the cushion, the module, and the frame of the car, and is also used to orient the cushion properly upon deployment.

BRIEF DESCRIPTION OF THE DRAWINGS

The present invention will now be described by way of example only, with reference to the accompanying drawings, which constitute a part of this specification and in which:

FIG. 1 shows an elevation view of material sections used to form one embodiment of the airbag cushion of the present invention;

FIG. 1A shows a side view of an inflated cushion formed from the material sections shown in FIG. 1;

FIG. 2 shows an elevation view of material sections used to form an alternate embodiment of the airbag cushion of the present invention;

FIG. 2A shows a side view of an inflated cushion formed from the material sections shown in FIG. 2;

FIG. 3 shows an elevation view of material sections used to form another alternate embodiment of the airbag cushion of the present invention;

FIG. 3A shows a side view of an inflated cushion formed from the material sections shown in FIG. 3;

FIG. 4 shows an elevation view of material sections used to form another alternate embodiment of the airbag cushion of the present invention;

FIG. 5 shows an elevation view of material sections used to form another alternate embodiment of the airbag cushion of the present invention;

FIG. 6 shows an elevation view of material sections used to form another alternate embodiment of the airbag cushion of the present invention;

FIG. 7 shows an elevation view of material sections used to form another alternate embodiment of the airbag cushion of the present invention.

While the invention is illustrated and may be described in connection with a preferred embodiment, it will be understood that it is in no way intended to limit the invention to that embodiment. On the contrary, it is intended to cover all alternatives, modifications and equivalents as may be included within the true spirit and scope of the invention as limited only by the appended claims.

DETAILED DESCRIPTION

FIG. 1 illustrates a potentially preferred embodiment of the cushion, which employs a body panel section 110 comprising a center panel 102 and a pair of side panels 104, 106 extending from opposed sides of the center panel 102. The body panel section 110 is attached to a front panel section 100, which has a generally elongated rectangular configuration, so that the side panel sections 104, 106 are attached to the front panel section 100 along each longitudinal side thereof, forming two parallel seams. The center panel 102 is attached to a lateral side of the front panel 100. A second lateral side of the front panel 100 is attached to a first side of a profile tuner panel 108, which in turn is also is attached to the side panels 104, 106 and the center panel section 102 of the body panel 110.

FIG. 1A shows the inflated cushion made from the panels illustrated in FIG. 1, the inflated cushion being deployed within an inner surface of a vehicle 10. It can be seen that the profile tuner panel forms part of an open mouth having a rod pocket construction. In this embodiment, a mouth is formed between the profile tuner panel 108 and the center panel 102. The mouth is formed into a rod pocket construction, where generally rigid rods 120 are attached along an open edge of the profile tuner panel 108 and along an open edge of the center panel 102. Vent holes 144 are optionally placed within the side panels 104, 106.

FIG. 2 illustrates a second embodiment of the cushion, wherein the profile tuner panel 208 is adapted to form a mouth having a closed pocket construction. This embodiment is constructed similarly to that shown in FIGS. 1 and 1A. However, in this embodiment, one side of the profile tuner panel 208 is attached directly to the center panel section 202 of the body panel 210, and the opposed side of the profile tuner panel 208 is attached directly to a lateral side of the front panel 200. A pair of side extensions 220, 222 on the profile tuner panel 208 are cut in such a way as to receive an inflator after the cushion has been sewn, thus forming a mouth having a closed loop or closed pocket construction.

FIG. 2A shows an inflated cushion made from the panels illustrated in FIG. 2. It can be seen that the profile tuner panel forms a mouth having closed loop or closed pocket construction, where holes defined by the side extensions 220, 222 are adapted to receive an inflator mechanism 242, as described above. Optional vent holes are illustrated at 244.

FIG. 3 illustrates another embodiment of the present invention, wherein the body panel is split into two body panel sections, a top body panel section 310 and a bottom body panel section 318. The top body panel section 310 includes a center panel 302 and two side panels 304, 306. The bottom body panel section 318 includes a center panel section 312, and two side sections 314, 316. In this embodiment, the profile tuner panel is attached between the center panels 302 and 312 of the top and bottom body panels 310, 318. The side panels 304, 306 of the top body panel 310 attach to the side panels 314, 316 of the bottom body panel 318 along one edge of each side panel. The opposed edge of each side panel 304,306 is attached to the front panel 300, forming the closed cushion. This embodiment employs a closed loop or closed pocket construction, wherein the profile tuner panel includes two side extensions 320, 322, which form holes for receiving an inflator when the cushion is sewn or attached together.

FIG. 3A shows an inflated cushion made from the panels illustrated in FIG. 3. It can be seen that the profile tuner panel forms a mouth having closed loop or closed pocket construction, where holes defined by the side extensions 320, 322 are adapted to receive an inflator mechanism 342, as described above. Optional vent holes are illustrated at 344.

FIG. 4 illustrates still another embodiment of the present invention, employing a generally rectangular body panel 410 and a generally rectangular front panel 400, each attached to a generally pyramidal or trapezoidal shaped profile tuner panel 408 to form an open mouth rod pocket construction. This embodiment may be formed from several separate fabric panels, or may be made from a single piece of fabric, as shown in FIG. 4.

FIG. 5 shows an alternate embodiment, where the profile tuner panel 508 is disposed between a top body panel 510 and a bottom body panel 518. The profile tuner panel 508 is generally hourglass shaped for attachment to the side panels 514, 516 from the top body panel 510, and for attachment to the side panels 504, 506 from the bottom body panel 518. Within the profile tuner panel 508, a circular mouth 550 is formed for receiving an inflation mechanism. It should be understood that the mouth 550 may be any desired shape to conform to the inflator mechanism, and the mouth may be located in alternate positions, as necessary. A generally square front panel 500 is attached between the top and bottom body panels 510 and 518 respectively, directly opposite the profile tuner panel 508, to complete the enclosed cushion.

FIGS. 6 and 7 also illustrate similar alternate embodiments of the present invention. As in FIG. 5, the cushion of FIGS. 6 shows the profile tuner panel 608 disposed between a top body panel 610 and bottom body panel 618. Similarly, FIG. 7 shows the profile tuner panel 708 disposed between a top body panel 710 and a bottom body panel 718. The shapes of the profile tuner panel, the body panels, and the front panel may be changed as desired, and FIGS. 6 and 7 illustrate examples of such different shapes. A generally rectangular mouth 650 is shown in FIG. 6, and a generally square mouth 750 is shown in FIG. 7, although the position and shapes of the mouths may be modified as necessary.

It is to be appreciated that the material panels may be formed from a number of substances including by way of example only and not limitation, woven fabrics, knitted fabrics, nonwovens, films and combinations thereof. Woven fabrics may be preferred with woven fabrics formed of tightly woven constructions such as plain or panama weave constructions being particularly preferred. Such woven fabrics may be formed of yarns of polyester, nylon 6, nylon 6,6 or other suitable materials as may be known to those of skill in the art. Multifilament yarns of nylon 6,6 having a relatively low denier per filament rating of about 6 denier per filament or less may be preferred. Denier per filament ratings of about 4 denier per filament or less may be preferred for bags requiring particularly good flexibility.

Thus, while specific embodiments of the invention have been shown and described, it is to be understood that the invention is not limited thereto, since modifications may certainly be made and other embodiments of the principals of this invention will no doubt occur to those skilled in the art to which this invention pertains. Therefore, it is contemplated by the appended claims to cover any such modifications and other embodiments as incorporating the features of this invention within the true spirit and scope of the following claims.

What is claimed is:

1. An inflatable cushion for use in a passenger restraint system deployed in an inner surface of a vehicle comprising:
    a front panel;
    at least one body panel; and
    a profile tuner panel;
    wherein said front panel is attached to said at least one body panel, and wherein said front panel is the primary impact area for said passenger restraint system;
    wherein said profile tuner panel is also attached to said body panel and connects said body panel to said inner surface when said inflatable cushion inflates, and wherein said profile tuner panel is asymmetrical in shape in at least one planar direction;
    wherein said inflatable cushion rotates upon inflation in a manner in part controlled by the shape of said profile tuner panel.

2. An inflatable cushion for use in a passenger restraint system deployed in an inner surface of a vehicle comprising:
    a front panel;
    at least one body panel; and
    a profile tuner panel;
    wherein said front panel is attached to said at least one body panel, and wherein said front panel is the primary impact areas for said passenger restraint system;
    wherein said profile tuner panel is also attached to said body panel and connects said body panel to said inner surface when said inflatable cushion inflates, and wherein said profile tuner panel is asymmetrical in shape in at least one planar direction;
    wherein said inflatable cushion rotates upon inflation in a manner in part controlled by the shape of said profile tuner panel;
    wherein said profile tuner panel and said at least one body panel are cut from a single piece of material.

3. An inflatable cushion for use in a passenger restraint system deployed in an inner surface of a vehicle comprising:
    a front panel;
    at least one body panel; and
    a profile tuner panel;
    wherein said front panel is attached to said at least one body panel, and wherein said front panel is the primary impact area for said passenger restraint system;
    wherein said profile tuner panel is also attached to said body panel and connects said body panel to said inner surface when said inflatable cushion inflates, and wherein said profile tuner panel is asymmetrical in shape in at least one planar direction;
    wherein said inflatable cushion rotates upon inflation in a manner in part controlled by the shape of said profile tuner panel;
    wherein said profile tuner panel forms at least part of a mouth having a rod-pocket construction.

4. An inflatable cushion for use in a passenger restraint system deployed in an inner surface of a vehicle comprising:
    a front panel;
    at least one body panel; and
    a profile tuner panel;
    wherein said front panel is attached to said at least one body panel, and wherein said front panel is the primary impact area for said passenger restraint system;
    wherein said profile tuner panel is also attached to said body panel and connects said body panel to said inner surface when said inflatable cushion inflates, and wherein said profile tuner panel is asymmetrical in shape in at least one planar direction;
    wherein said inflatable cushion rotates upon inflation in a manner in part controlled by the shape of said profile tuner paner;
    wherein said profile tuner panel forms at least part of a mouth having a closed pocket construction.

5. The inflatable cushion set forth in claim 1, further including a second body panel.

6. The inflatable cushion set forth in claim 5, wherein said profile tuner panel is attached between said at least one body panel and said second body panel.

7. The inflatable cushion set forth in claim 1, wherein said profile tuner panel is formed into a generally trapezoidal shape.

8. An inflatable cushion for use in a passenger restraint system deployed in an inner surface of a vehicle comprising:
    a front panel;
    at least one body panel; and
    a profile tuner panel;
    wherein said front panel is attached to said at least one body panel, and wherein said front panel is the primary impact area for said passenger restraint system;
    wherein said profile tuner panel is also attached to said body panel and connects said body panel to said inner surface when said inflatable cushion inflates, and wherein said profile tuner panel is asymmetrical in shape in at least one planar direction;
    wherein said inflatable cushion rotates upon Inflation in a manner in part controlled by the shape of said profile tuner panel;
    wherein said profile tuner. panel includes a pair of side extensions projecting from opposed sides thereof.

9. The inflatable cushion set forth in claim 8, wherein at least one of said side extensions defines a hole for receiving an inflator mechanism.

* * * * *